(12) United States Patent
Benoliel (10) Patent No.: US 8,192,090 B2
(45) Date of Patent: Jun. 5, 2012

(54) CARD-BASED MOUNTING ASSEMBLY AND MAINTENANCE SYSTEM

(76) Inventor: Eli Benoliel, Zikhron-Yaakov (IL)

( * ) Notice: Subject to any disclaimer, the term of this patent is extended or adjusted under 35 U.S.C. 154(b) by 94 days.

(21) Appl. No.: 12/610,488

(22) Filed: Nov. 2, 2009

(65) Prior Publication Data

US 2011/0103744 A1 May 5, 2011

(51) Int. Cl.
*G02B 6/36* (2006.01)
*H05K 1/18* (2006.01)

(52) U.S. Cl. ............ 385/53; 385/92; 385/129; 439/577; 361/748

(58) Field of Classification Search .......... 385/53, 385/14, 88, 89, 92, 93, 94, 129, 130, 131, 385/132; 439/577; 361/748
See application file for complete search history.

(56) References Cited

U.S. PATENT DOCUMENTS

| | | | |
|---|---|---|---|
| 4,151,580 A * | 4/1979 | Struger et al. | 361/801 |
| 4,348,276 A * | 9/1982 | Tateishi et al. | 209/573 |
| 5,712,942 A * | 1/1998 | Jennings et al. | 385/134 |
| 6,229,942 B1 * | 5/2001 | Engberg et al. | 385/39 |
| 6,305,848 B1 | 10/2001 | Gregory | |
| 6,307,983 B1 | 10/2001 | Goossen | |
| 6,678,448 B2 * | 1/2004 | Moisel et al. | 385/101 |
| 7,006,325 B2 * | 2/2006 | Emberty et al. | 360/98.06 |
| 7,585,119 B2 * | 9/2009 | Sasaki | 385/89 |
| 2003/0007285 A1 * | 1/2003 | Emberty et al. | 360/98.06 |
| 2003/0181098 A1 * | 9/2003 | Kropp et al. | 439/577 |
| 2003/0221706 A1 | 12/2003 | Kiani et al. | |
| 2009/0097797 A1 | 4/2009 | Kewitsch | |
| 2011/0103744 A1 * | 5/2011 | Benoliel | 385/53 |

FOREIGN PATENT DOCUMENTS

WO WO 2011/051953 5/2011

OTHER PUBLICATIONS

Communication Relating to the Results of the Partial International Search Dated Aug. 1, 2011 From the International Searching Authority Re. Application No. PCT/IL2010/000910.
International Search Report and the Written Opinion Dated Oct. 20, 2011 From the International Searching Authority Re. Application No. PCT/IL2010/000910.

* cited by examiner

*Primary Examiner* — Brian Healy (57) ABSTRACT

A backplane and card assembly comprises: a backplane having optical and electrical connectors; a plurality of cards each comprising an optical receiver and electrical connectors, for fitting into the backplane to obtain operational optical and electrical connections via the backplane; and an automatic maintenance unit comprising a gripping arm configured to remove and replace cards from the backplane. Having both the optical and electrical connectors together on the backplane allows a relatively simple movement of the gripping arm to remove and replace the card.

10 Claims, 7 Drawing Sheets

CARD-BASED MOUNTING ASSEMBLY AND MAINTENANCE SYSTEM

FIELD AND BACKGROUND OF THE INVENTION

The present invention, in some embodiments thereof, relates to a card-based mounting assembly and maintenance system, more particularly but not exclusively to a backplane or the like which supports cards, and, more particularly, but not exclusively, to communications equipment based on such an assembly.

A backplane is a circuit board, usually a printed circuit board that connects several connectors in parallel to each other, so that each pin of each connector is linked to the same relative pin of all the other connectors, forming a computer bus. It is used as a backbone to connect several printed circuit boards together to make up a complete computer system.

Backplanes are normally used in preference to cables because of their greater reliability. In a cabled system, the cables need to be flexed every time that a card is added to or removed from the system; and this flexing eventually causes mechanical failures. A backplane does not suffer from this problem, so its service life is limited only by the longevity of its connectors. For example, the DIN 41612 connectors used in the VMEbus system can withstand 50 to 500 insertions and removals (called mating cycles), depending on their quality.

Backplanes have also become commonplace for communications switches including telephone exchanges, as well as disk enclosures, disk arrays, and servers. A problem with telephone exchanges, particularly the local exchange, is that these are dispersed geographically to be near or around the various premises to which the telephone services are provided. Maintenance, of even the most trivial nature, typically requires an engineer to be sent on site.

It is highly desirable to automate maintenance of such backplane based switching systems, so as to save on the need to call out the engineer. However a difficulty arises in that much in the way of modern communication traffic passes via optical fiber. Backplanes today do not include optical connectors and the cards fitted onto the backplane need to have separate connectors for any optical connections. These connectors need to be removed when cards are replaced in maintenance operations. Removing the optical connectors requires manual intervention, and thus it is not possible for the maintenance operation to be automated.

U.S. Pat. No. 7,418,165 teaches a flexible optical connector suitable for use in an optical backplane for interconnecting optical circuit boards, and methods of making the optical connector. The flexible optical connector comprises a plurality of waveguides on two or more levels providing a plurality of light paths that allow light communication between optical circuit boards. The optical connector can be manufactured separately from the backplane and thereafter mounted on the backplane. The backplane may also have a mounting structure for removably retaining and positioning the optical circuit board and may, optionally, include electrical traces for providing electrical interconnections between the circuit boards. The backplane provided however is not optimized for allowing automatic maintenance.

SUMMARY OF THE INVENTION

The present embodiments provide a mounting assembly for electrical and optical cards, which allow the cards to be removed and replaced within the assembly by a simple movement that can be managed by a robot arm.

According to an aspect of some embodiments of the present invention there is provided1. A backplane and card assembly comprising:

a backplane having optical and electrical connectors;

a plurality of cards each comprising an optical receiver and electrical contacts, fitted into said backplane such as to provide operational optical and electrical connections via said backplane; and an automatic maintenance unit comprising a gripping arm configured to remove and replace cards from said backplane.

In an embodiment, said cards comprise a first edge configured with a first connector for mating into a corresponding connector of said backplane, said first connector including both said optical receiver and electrical contacts.

In an embodiment, said cards comprise a second edge comprising a second connector for connecting to a switch device also mounted on said backplane, said switch device providing backup connectivity to neighboring cards, said second edge being perpendicular to said first edge and said second connector being configured as a sliding connector to allow sliding in a direction parallel with said second edge, to remove or replace a card.

In an embodiment, said first connector and said corresponding backplane connector are configured to accept or release a card sliding in a direction perpendicular to a planar surface of said backplane.

In an embodiment, said gripping arm is configured to remove or replace cards by imparting a motion to a respective card in said direction perpendicular to said planar surface of said backplane.

In an embodiment, said gripping arm is located on a mount configured to move in parallel with said planar surface of said backplane to locate a card requiring maintenance.

In an embodiment, said maintenance unit further comprises a second gripping arm.

In an embodiment, said plurality of cards comprise processors and said backplane further comprises pipes for providing coolant to said processors.

In an embodiment, said plurality of cards are any one of the group comprising communications switches, electronic processors, micro-line cards, memory cards, computer add-on cards and combinations thereof.

According to a second aspect of the present invention there is provided a card and switch assembly comprising:

two opposing rows of mounted switches, each switch being paired with a corresponding switch from an opposing row to form a pair of switches;

a plurality of cards each comprising an optical receiver and electrical connectors, fitted between respective pairs of switches via connectors, to provide operational optical and electrical connections to said connectors via said switches; and an automatic maintenance unit comprising a gripping arm configured to remove and replace cards from between said switches.

In an embodiment, said cards comprise a first sliding connector along a first edge for connecting to a first switch of said pair and a second sliding connector along a second opposite edge for connecting to a second switch of said pair, each sliding connector to allow sliding in a direction parallel with said first and second edges, to remove or replace a respective card between said switches.

According to a third aspect of the present invention there is provided a switch card for placing alongside operational cards in a backplane and card assembly, the switch card being connected to said backplane and extending outwardly in a first direction therefrom, and comprising a sliding connector along an edge of said switch card said edge being along said first direction, said connector being to connect slidably to an operational card connected alongside said switch card on said backplane, such that said operational card is electrically connected to said switch card and said operational card is removable by sliding along said first direction, said electrical connections providing connections to neighboring operational cards.

According to a fourth aspect of the present invention there is provided a card having a first surface and a second surface, being for a backplane and card assembly, the card comprising:

a first edge along a first axis of said card, said first edge having a first connector for connecting to said backplane, said first connector including at least one electrical contact and an optical connection, wherein the electrical contact extends onto said first surface and said optical connection extends onto said second surface;

said first connector being configured to fit into a corresponding connector in said backplane and to be removed therefrom by movement along a second axis of said card perpendicular to said first axis, thereby to allow removal of said card from said backplane by an automatic gripping arm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volitile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to a mounting assembly for cards, such as those requiring both electrical and optical connections, and, more particularly, but not exclusively, to a mounting assembly such as one based on a backplane.

In the present embodiments, electrical and optical connections are provided on the backplane and corresponding connections are provided on the connection side of the card. The card is removed and/or replaced by a movement that is substantially along (in parallel with) the plane in which the card is mounted, typically, but not necessarily, perpendicular to the backplane. The movement for removal and replacement is one that can be provided by a robot arm and thus can be managed remotely without the need for an on-site engineer.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
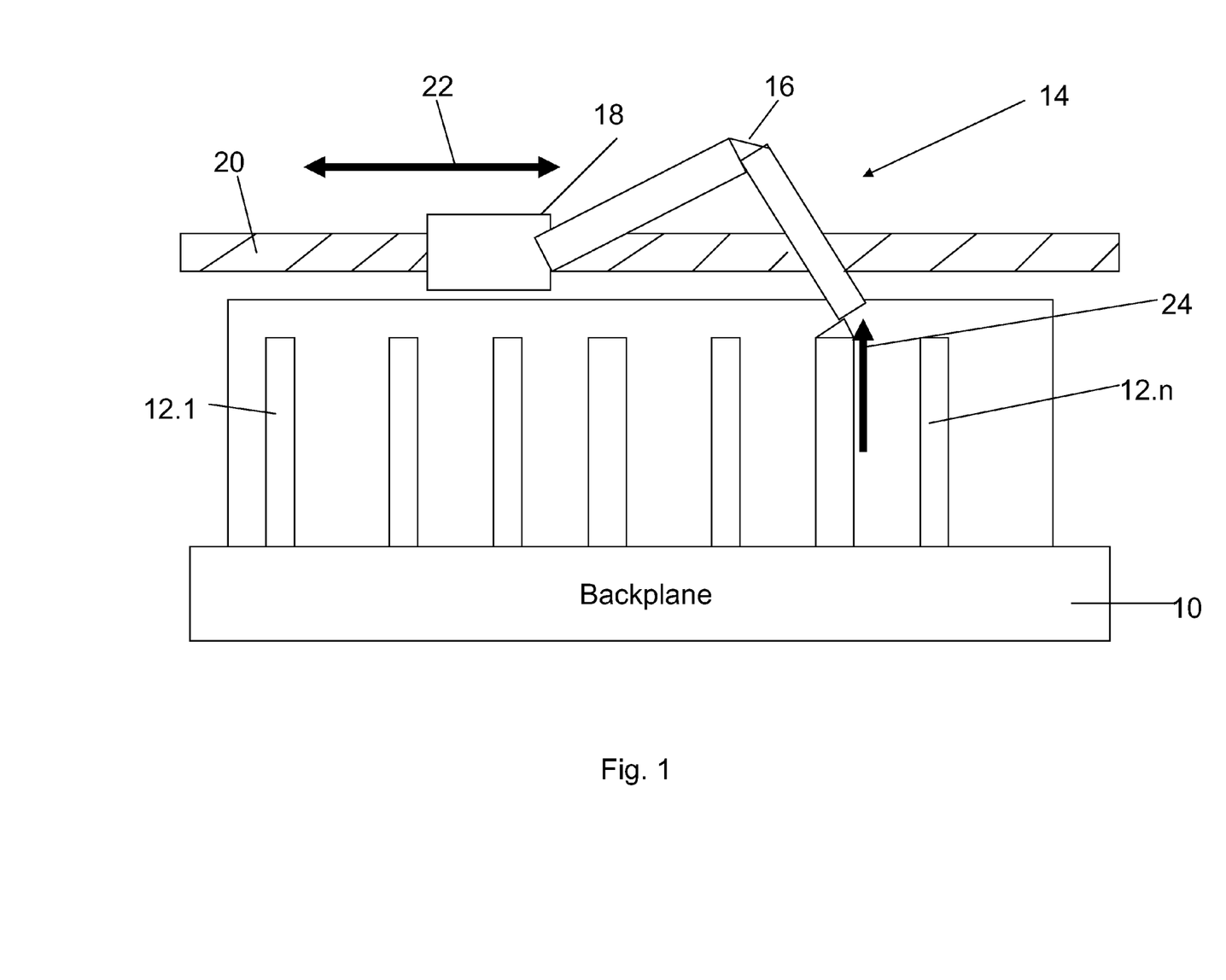
FIG. 1 is a simplified diagram showing cards on a backplane with a gripping arm for replacement of the cards, according to a first embodiment of the present invention.

Referring now to the drawings, FIG. 1 illustrates a backplane and card assembly according to a first embodiment of the present invention. Backplane 10 has optical and electrical connectors, as will be discussed hereinbelow.

Cards 12.1 ... 12.n each comprise an optical receiver and electrical connectors, which will be discussed in greater detail below, and the connectors fit into backplane 10 such as to provide operational optical and electrical connections between the cards and the backplanes. An automatic maintenance unit 14 comprises a gripping arm 16 which is configured to remove and replace cards from the backplane. Typically the gripping arm sits on a mounting unit 18 which moves along rail 20 in the directions indicated by double arrow 22. In practice rail 20 is often a double rail and mounting unit 18 includes a cable allowing it to receive power and signals.

The cards may be removed from the backplane in the direction indicated by arrow 24, namely in a direction perpendicular to the plane of the backplane 10.

Figure 2:
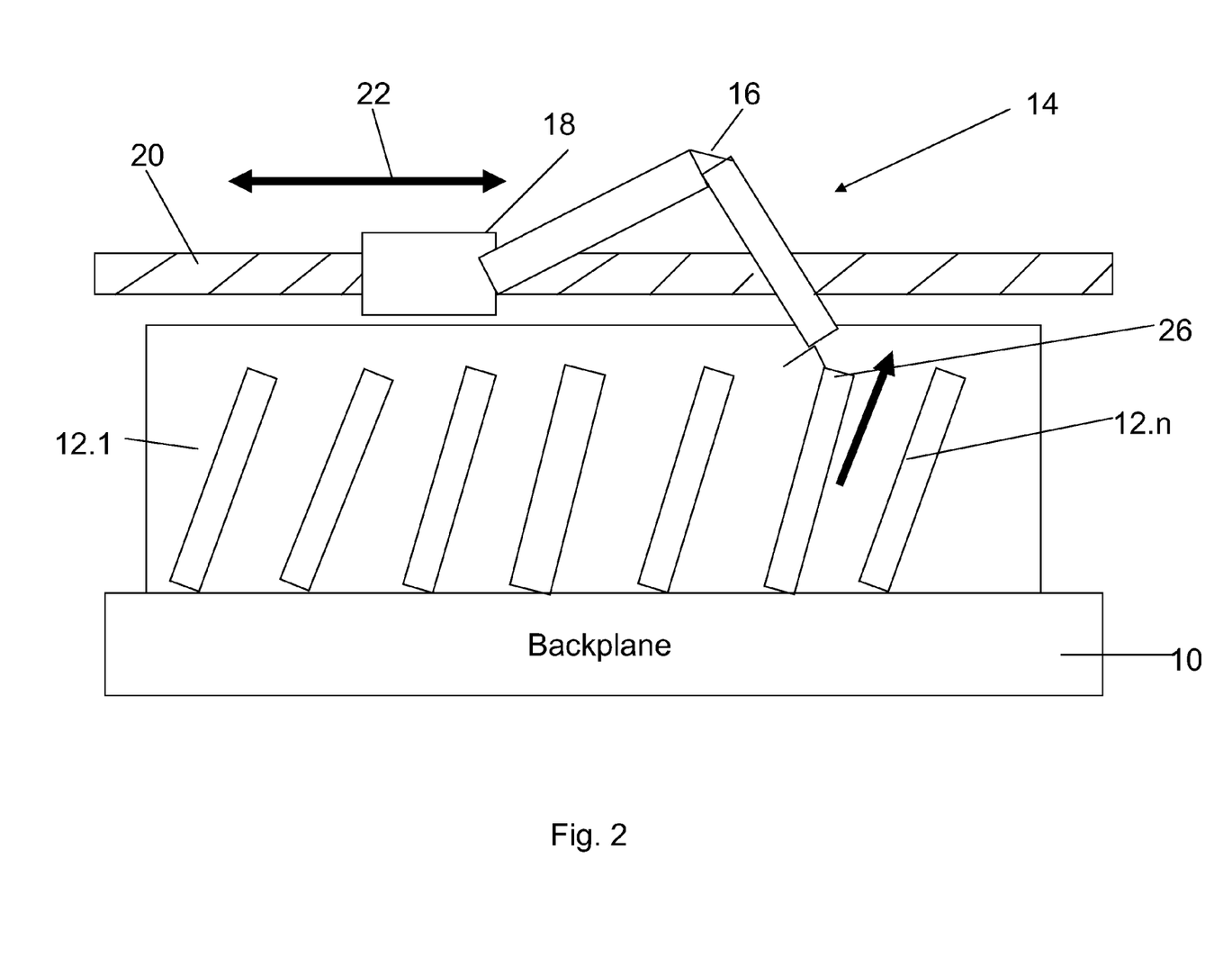
FIG. 2 is a variation of FIG. 1 in which the cards are angled onto the backplane.

The backplane may alternatively be designed to accommodate angular fitting of the cards, such as shown in FIG. 2. Parts that are the same as in FIG. 1 are given the same reference numerals and are not described again except as necessary for an understanding of the present embodiment. The card mountings on the backplane 10 are angled, but the cards are inserted and removed by a similar movement, this time in the direction of arrow 26.

Figure 3A:
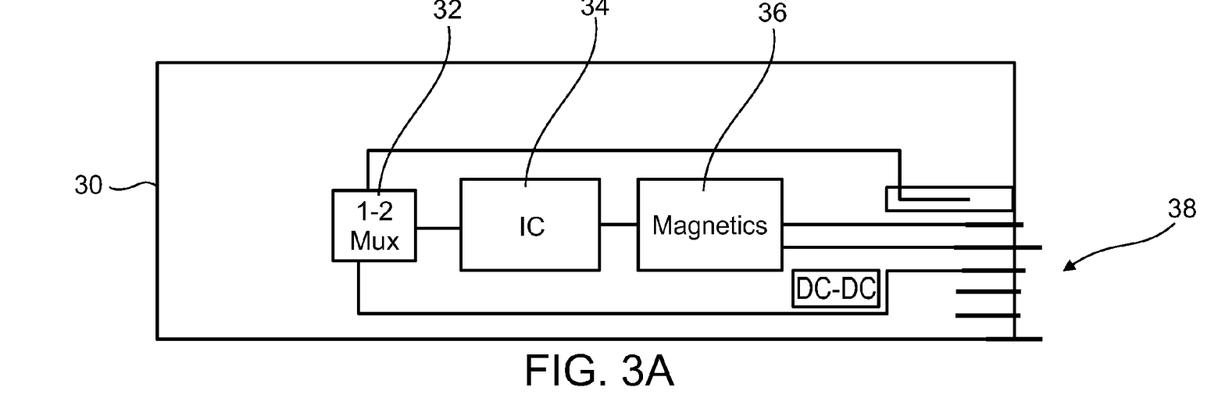
FIGS. 3A and 3B are simplified diagrams showing upper and lower sides of a card according to an embodiment of the present invention having both electrical and optical components and where both electrical and optical connections are via the backplane.

Reference is now made to FIG. 3A which shows one side of a card constructed according to an embodiment of the present invention. The card 30 has electronic components including multiplexer 32, integrated circuit 34 and magnetics 36. The particular electronic components are certain components of a communication switch and are merely for illustrative purposes. In practice these components would vary according to application. Also electronic components may be arbitrarily or otherwise distributed between the two sides of the card. A series 38 of pins form an electrical part of a connector and mate into holes in the backplane 10.

Figure 3B:
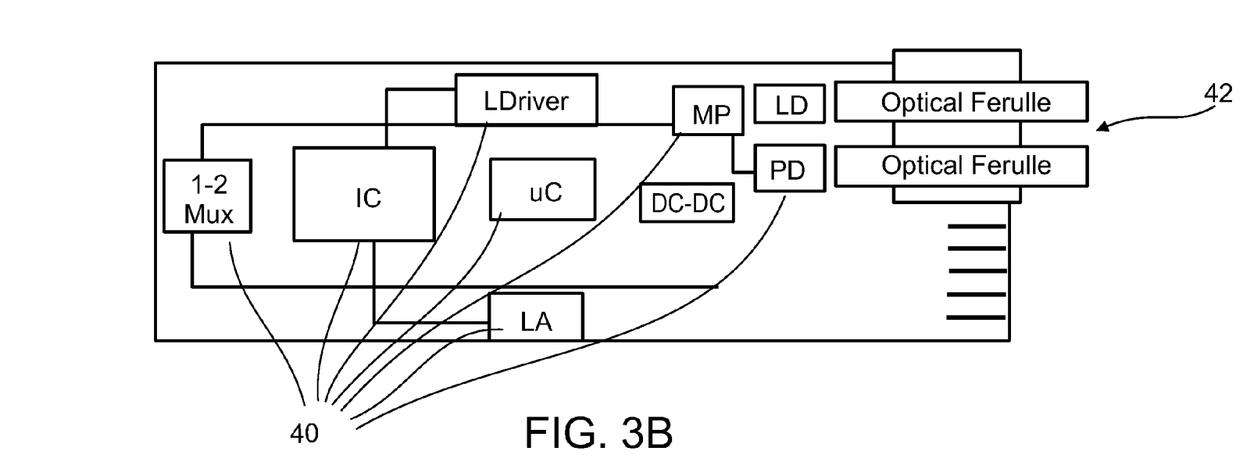

FIG. 3B shows the obverse side of card 30. Additional components 40 of a communication switch card are shown. Two optical ferrules 42 form an optical part of the connector and also mate into corresponding holes in the backplane 10. It is noted that the electrical pins and optical ferrules are part of the same connector and are on the same edge of the card.

The connector that makes up the electrical pins and optical ferrules may mate into a corresponding connector of the backplane.

Figure 4A:
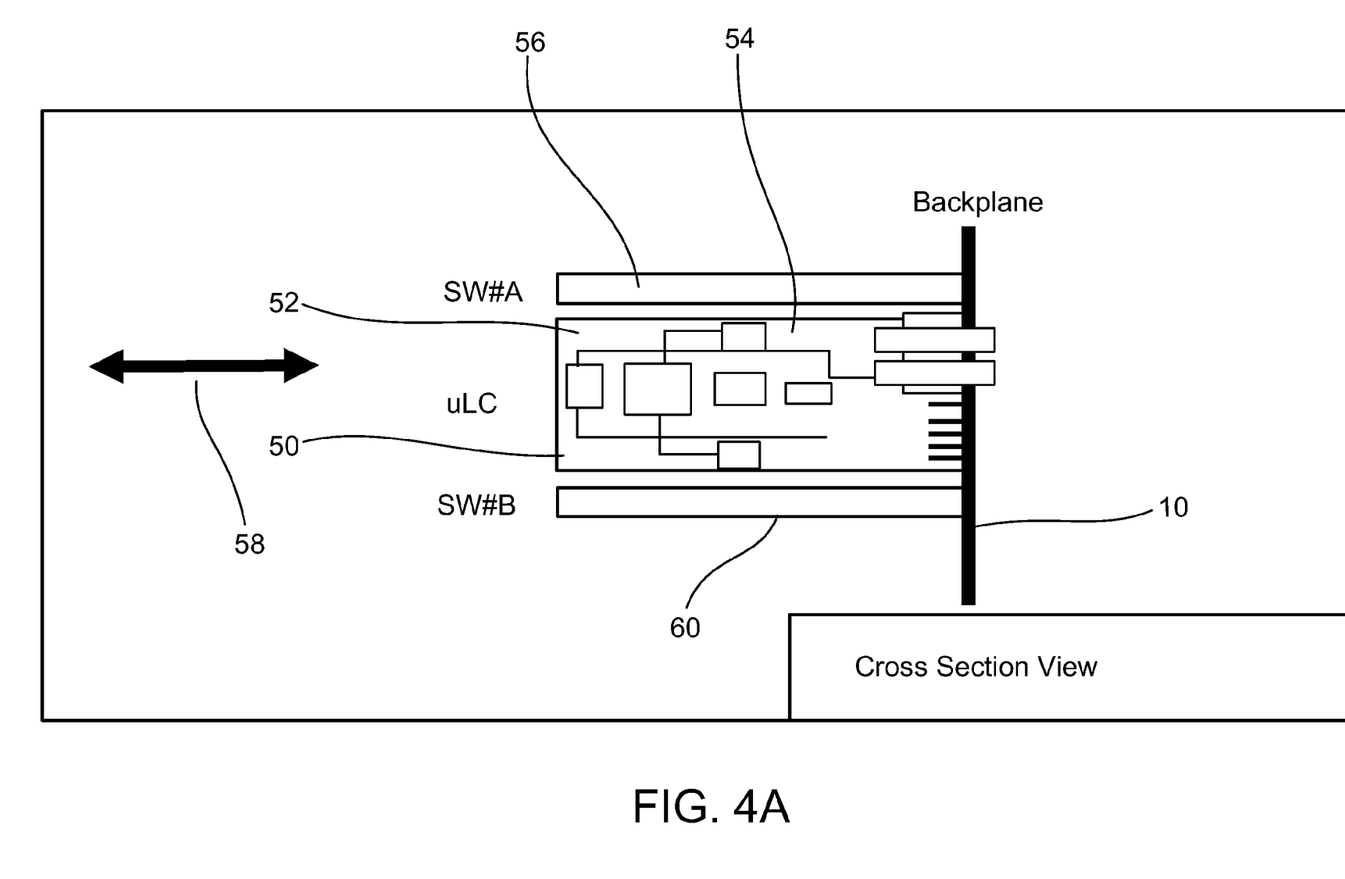
FIG. 4A is a cross-sectional view across the backplane showing a card and two switching devices attached thereto in accordance with an embodiment of the present invention.

Reference is now made to FIG. 4A, which is a simplified drawing illustrating a section across the plane of the backplane 10 and along the plane of the card.

The card 50 is mounted on backplane 10 and includes a second connector 52 along a second edge 54. The second connector is a slidable connector which connects to a switch device 56 which is also mounted on the same backplane 10. The switch device may for example provide backup connectivity to neighboring cards. The sliding connector allows sliding of the card in a direction parallel with the second edge 54, namely in the direction of arrow 58, to remove or replace the card without needing to remove switch device 56. A second switch device 60 may be provided on the other side with a similar sliding connector.

That is to say, the backplane connector on the card, and the sliding connectors to the switches, as well as the corresponding backplane connector, are all configured and structured to accept or release a card sliding in the direction of arrow 58, which would usually be in the direction perpendicular to the planar surface of backplane 10.

Figure 4B:
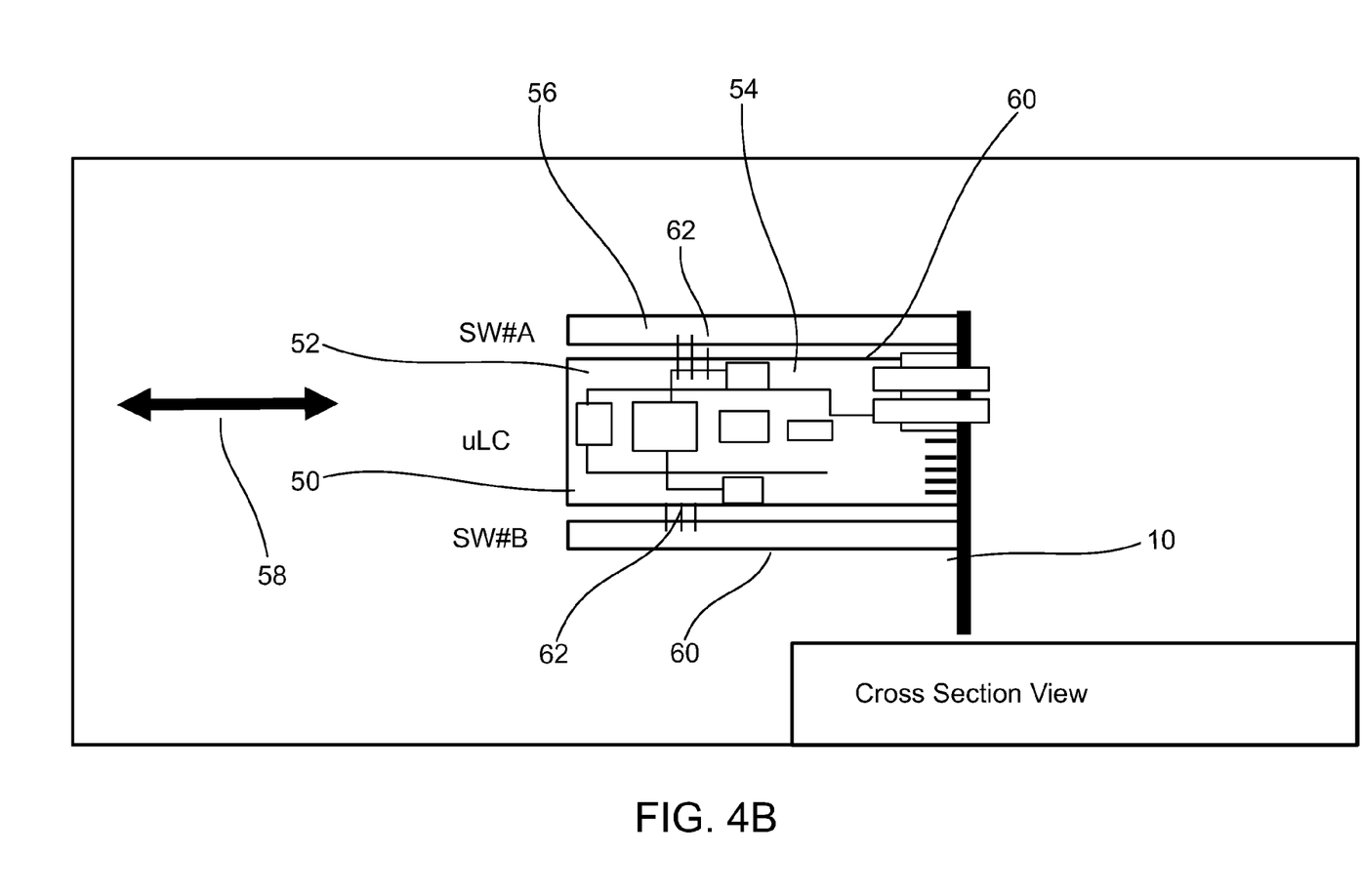
FIG. 4B is a variation on FIG. 4A showing a card and two switching devices connected directly and thus obviating the need for a backplane, according to a further embodiment of the present invention.

FIG. 4B is a variation of the drawing of FIG. 4A. In the variation of FIG. 4B the card 50 connects directly to the switch devices 60 via connectors 62 at the top and bottom of the card itself. There is thus no need for a backplane connector, although mechanical support may be provided.

Figure 5:
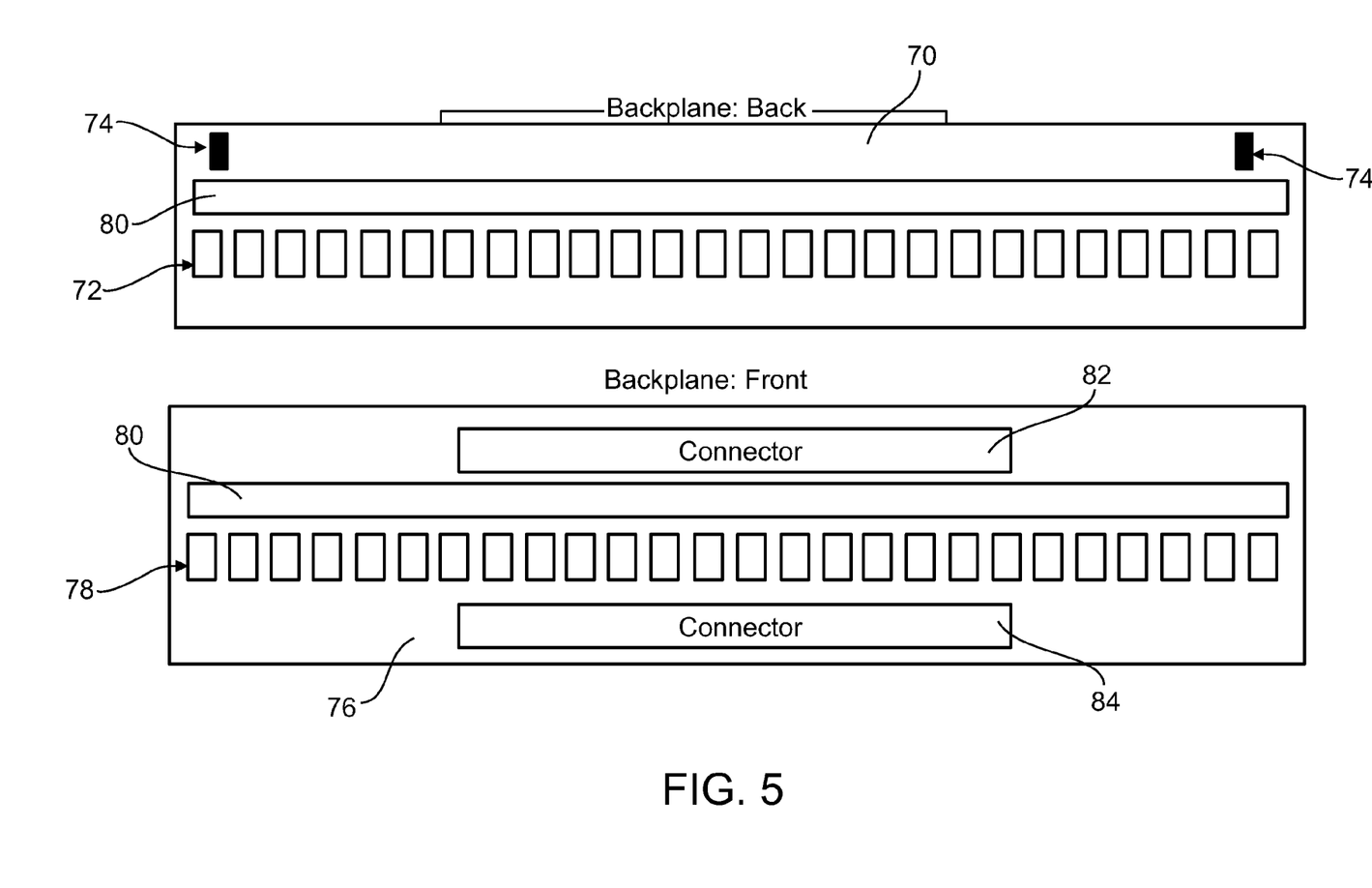
FIG. 5 is a simplified diagram showing front and back views of a card slot of a backplane, modified for receiving both electrical and optical connectors.

Reference is now made to FIG. 5, which shows respective front and back views of a backplane slot for incorporating cards according to embodiments of the present invention. The back side 70 of the backplane allows for connection of an external cable bus via electrical connectors 72 and power connectors 74. The front 76 of the backplane allows for the slotting in of the card and switching devices. The electrical contacts are connected into sockets 78 and the optical ferrules are connected through slot 80. The switching devices are connected into connectors 82 and 84.

Figure 6:
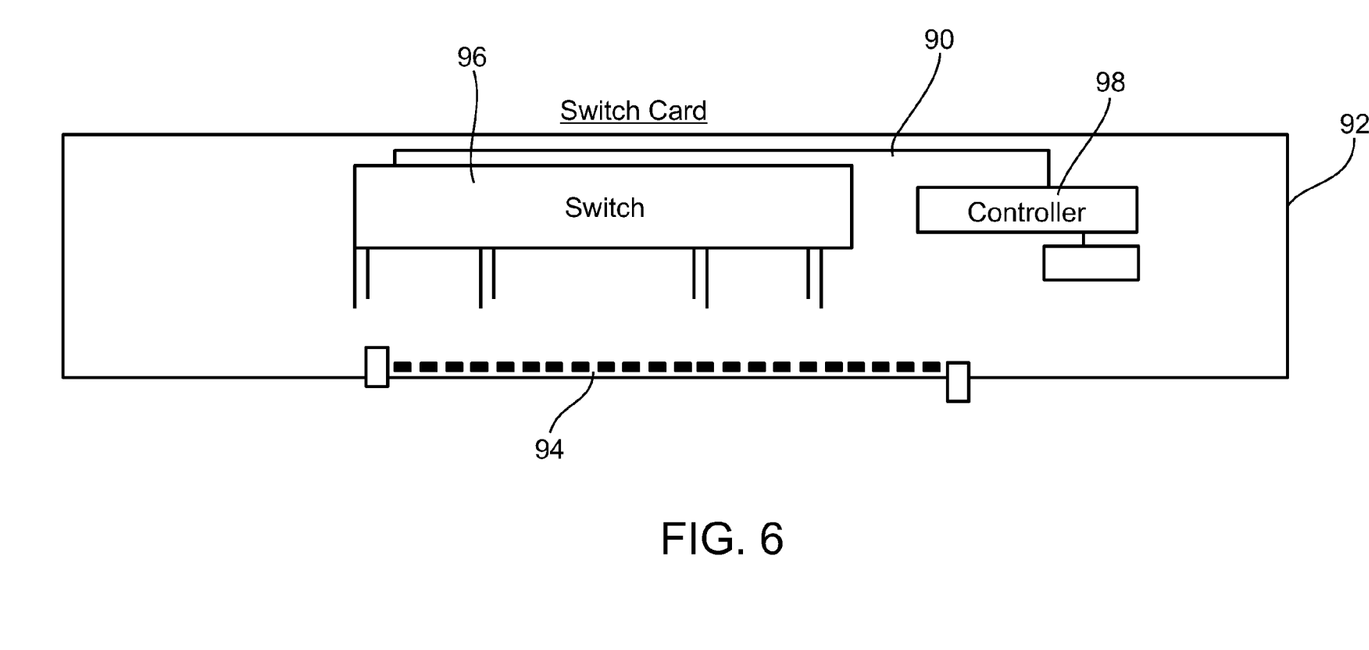
FIG. 6 is a simplified diagram showing a switching device having a sliding connector according to an embodiment of the present invention.

Reference is now made to FIG. 6, which is a simplified diagram illustrating a switch card for use with the present embodiments. The switch card 90 fits into sockets 82 or 84 of the backplane 10 at edge 92. Electrical connector 94 fits slidably into the corresponding connector of the card 12.$n$ Switch 96 transfers signals to redundant neighboring cards under control of microcontroller 98.

Returning to FIG. 1, and gripping arm 16 removes or replace cards by imparting a motion to the particular card in the direction of arrow 58. The gripping arm 16 is located on mount 18 as discussed, and mount 18 travels along rail 20. The mount moves the arm in parallel with the backplane to locate the arm against a card requiring maintenance. The rail may be supplied with a thread and the mount simply advances along the thread.

The gripping arm may be controlled remotely to carry out maintenance. In the case of card failure, the switching devices 56 and 60 allow neighboring cards to take the place of the failed card. However the failure is noted, say at a control center. Replacement of the failed card may then be carried out using the gripping arm under remote control from the control center. Some users may replace failed cards immediately. Others may replace cards prior to failure based on a mean time to failure statistic and others may replace cards after failure based on a mean time to failure statistic of the neighboring cards switched in as replacements.

In one embodiment the maintenance unit comprises a second gripping arm for use in the event of failure of the first gripping arm.

The above description has concentrated on communications switches. However the present embodiments are relevant to any kinds of cards that are set up in a multi-card assembly, including communications switches, electronic processors, micro-line cards, memory cards including flash cards, and add-on cards for different devices. In the case of electronic processors the backplane may further comprise pipes for providing coolant to the processors. Combinations of these different cards may also be provided.

In one embodiment a backplane as such is not used, but rather the cards are fixed between two parallel rows of switching devices in a switch assembly. In this case the electrical and optical connectors are made part of the sliding connectors to the switches on either side.

It is expected that during the life of a patent maturing from this application many relevant backplanes and cards, as well as communication switching devices will be developed and the scope of the corresponding terms of these and other features mentioned in the description is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A backplane and card assembly comprising:
   a backplane having optical and electrical connectors;
   a plurality of cards each comprising an optical receiver and electrical contacts, fitted into said backplane such as to provide operational optical and electrical connections via said backplane, wherein said cards comprise a first edge configured with a first connector for mating into a corresponding connector of said backplane, said first connector including both said optical receiver and electrical contacts, wherein said cards comprise a second edge comprising a second connector for connecting to a switch device also mounted on said backplane, said switch device providing backup connectivity to neighboring cards, said second edge being perpendicular to said first edge and said second connector being configured as a sliding connector to allow sliding in a direction parallel with said second edge, to remove or replace a card; and
   an automatic maintenance unit comprising a gripping arm configured to remove and replace cards from said backplane.

2. The assembly of claim 1, wherein said first connector and said corresponding backplane connector are configured to accept or release a card sliding in a direction perpendicular to a planar surface of said backplane.

3. The assembly of claim 2, wherein said gripping arm is configured to remove or replace cards by imparting a motion to a respective card in said direction perpendicular to said planar surface of said backplane.

4. The assembly of claim 2 wherein said gripping arm is located on a mount configured to move in parallel with said planar surface of said backplane to locate a card requiring maintenance.

5. The assembly of claim 1, wherein said maintenance unit further comprises a second gripping arm.

6. The assembly of claim 1, wherein said plurality of cards comprise processors and said backplane further comprises pipes for providing coolant to said processors.

7. The assembly of claim 1, wherein said plurality of cards are any one of the group comprising communications switches, electronic processors, micro-line cards, memory cards, computer add-on cards and combinations thereof.

8. A card and switch assembly comprising:
   two opposing rows of mounted switches, each switch being paired with a corresponding switch from an opposing row to form a pair of switches;
   a plurality of cards each comprising an optical receiver and electrical connectors, fitted between respective pairs of switches via connectors, to provide operational optical and electrical connections to said connectors via said switches, wherein said cards comprise a first sliding connector along a first edge for connecting to a first switch of said pair and a second sliding connector along a second opposite edge for connecting to a second switch of said pair, each sliding connector to allow sliding in a direction parallel with said first and second edges, to remove or replace a respective card between said switches; and
   an automatic maintenance unit comprising a gripping arm configured to remove and replace cards from between said switches.

9. A switch card for placing alongside operational cards in a backplane and card assembly, the switch card being connected to said backplane and extending outwardly in a first direction therefrom, and comprising a sliding connector along an edge of said switch card said edge being along said first direction, said connector being to connect slidably to an operational card connected alongside said switch card on said backplane, such that said operational card is electrically connected to said switch card and said operational card is removable by sliding along said first direction, said electrical connections providing connections to neighboring operational cards.

10. A card having a first surface and a second surface, being for a backplane and card assembly, the card comprising:
   a first edge along a first axis of said card, said first edge having a first connector for connecting to said backplane, said first connector including at least one electrical contact and an optical connection, wherein the electrical contact extends onto said first surface and said optical connection extends onto said second surface;
   said first connector being configured to fit into a corresponding connector in said backplane and to be removed therefrom by movement along a second axis of said card perpendicular to said first axis, thereby to allow removal of said card from said backplane by an automatic gripping arm.

* * * * *